Dec. 8, 1953   J. MUNZ ET AL   2,661,827
AUTOMATIC VENDING MACHINE
Filed Jan. 16, 1948   5 Sheets-Sheet 1

INVENTORS
J. MUNZ
J. TICHOPAD
By: Fetherstonhaugh & Co.
ATT'YS

Dec. 8, 1953  J. MUNZ ET AL  2,661,827
AUTOMATIC VENDING MACHINE
Filed Jan. 16, 1948  5 Sheets-Sheet 3
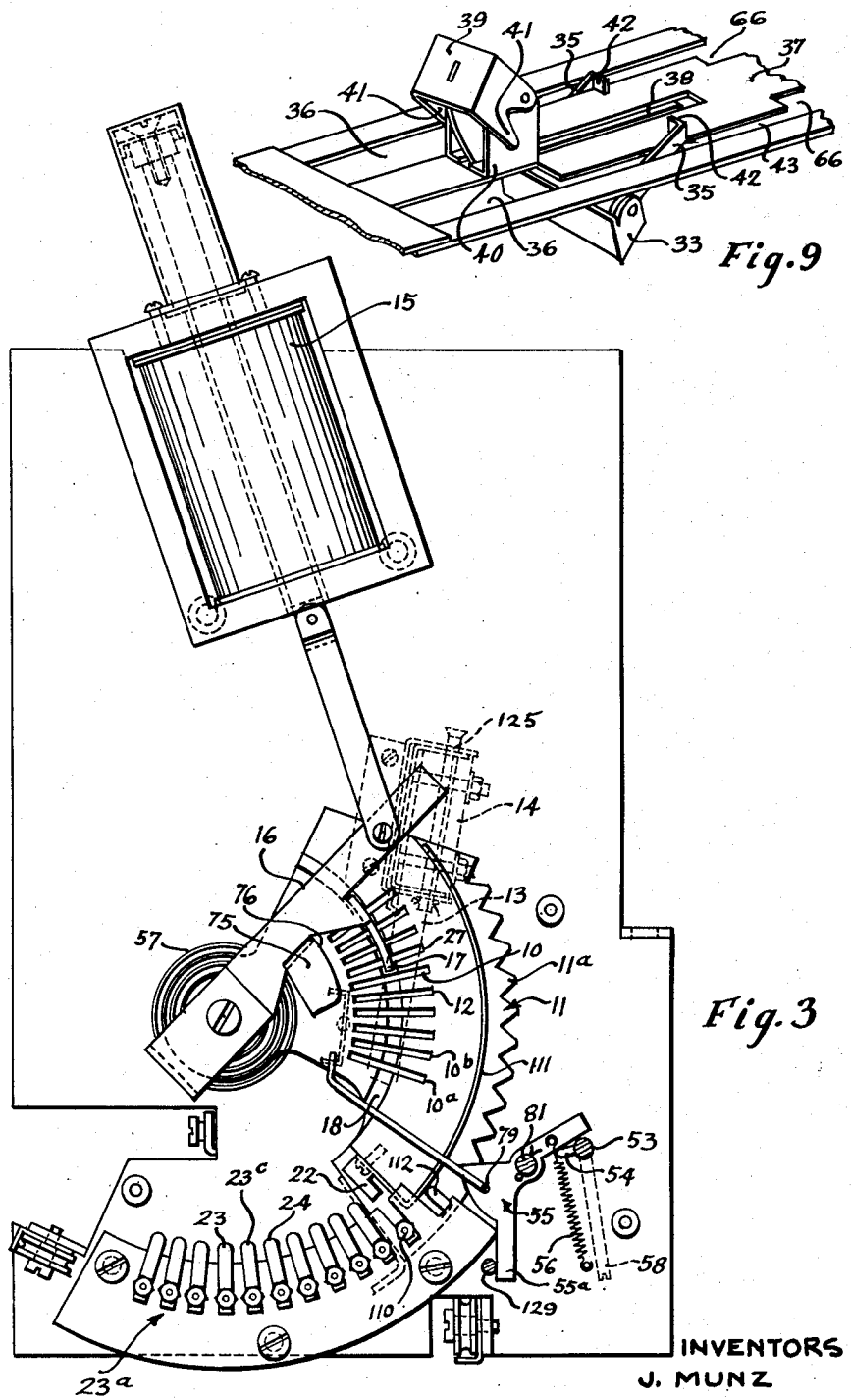
INVENTORS
J. MUNZ
J. TICHOPAD
By: Fetherstonhaugh & Co.
ATT'YS

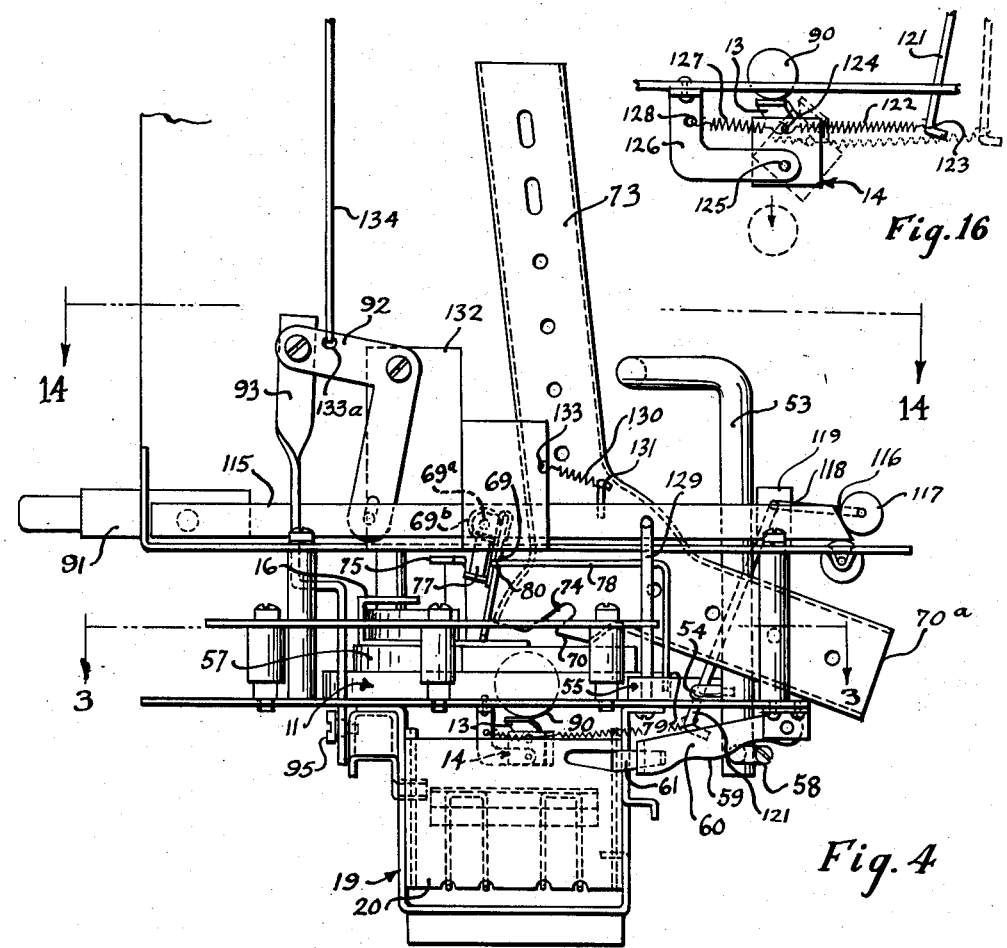
Fig. 16
Fig. 4
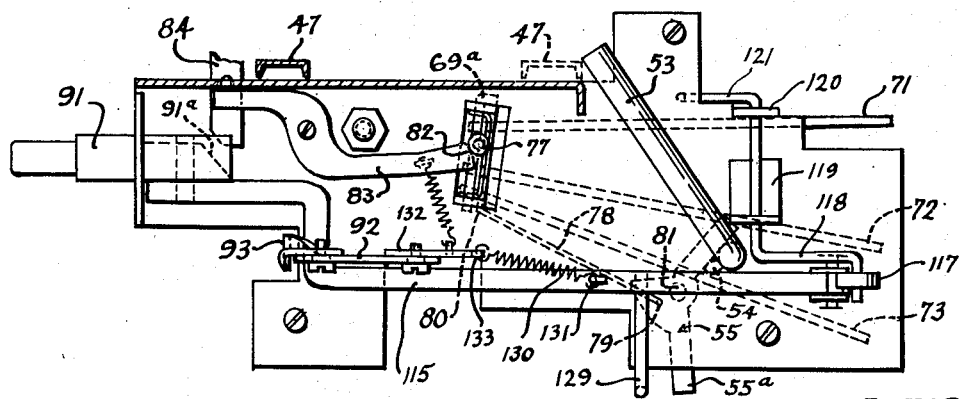
Fig. 14
INVENTORS
J. MUNZ
J. TICHOPAD
By: Fetherstonhaugh & Co.
ATT'YS Dec. 8, 1953    J. MUNZ ET AL    2,661,827
AUTOMATIC VENDING MACHINE
Filed Jan. 16, 1948    5 Sheets-Sheet 5

INVENTORS
J. MUNZ
J. TICHOPAD
By: Fetherstonhaugh & Co.
ATT'YS

Patented Dec. 8, 1953

2,661,827

UNITED STATES PATENT OFFICE 2,661,827

AUTOMATIC VENDING MACHINE

Jaroslav Munz and Jaroslav Tichopad, Toronto, Ontario, Canada, assignors to Vend-O-Matic Limited, Toronto, Ontario, Canada, a company of Ontario Application January 16, 1948, Serial No. 2,778

4 Claims. (Cl. 194—9)

This invention relates to an electrically operated apparatus for vending commodities of various kinds which are packaged in unitary form.

The prime object of the present invention is to provide a vending machine of this class which may be operated to effect the ejection of an article of merchandise by an insertion of any predetermined value of coinage into the machine and the selection of merchandise corresponding to the sum entered by the operator by actuating a selecting rod mounted in conjunction with a merchandise storing column, the said article of merchandise being discharged from the machine by electrically actuated means.

Another object of the present invention is to provide a vending machine as before wherein the total value of coinage entered in the machine may be made up of multiples of the lowest denomination of coin or basic coin value accepted by the machine or any combination of such multiples in any order of succession.

A still further object of the present invention is to provide a vending machine capable of accepting a plurality of coins constituting a predetermined purchasing sum in which the purchasing prices corresponding to the various columns may be different for each, said machine being capable of being built to vend merchandise for any desired price.

A still further object of the invention is to provide a vending machine of this type which includes a jam-proof mechanism whereby the electrical means operating the device is capable of actuation by one coin at a time only, the said machine discharging merchandise only when the proper purchasing amount is entered thereinto, the sum of coinage entered in the machine being returnable to the operator by a coin return mechanism at any time before actuation of the selecting rod, said coin return mechanism being independent of the electrical means governing discharge of merchandise from the machine.

A still further object of the present invention is to provide a vending machine which is jam proof and which is not easily injured by an operator and which provides a credit indicator which functions as an adding machine to provide a visual indication of the total credit at any time during entry of coins to effect a purchase.

With these and other objects in view the invention generally relates to improvements in a novel combination of elements in a vending machine having at least one merchandise column and electrical drive means for causing merchandise to be discharged therefrom and a selecting rod for the latter actuable by an operator, comprising, electrical switch means operatively connected to the selecting rod, slotted armature switch means and electrical drive means therefor, tertiary switch means mounted beneath the said armature and actuable by a valid coin disposed in a slot of the latter, and means electrically connecting the drive means for said armature and said tertiary switch means. In conjunction with the slotted armature means are also included means for successively limiting additive movements of the slotted armature to predetermined distances corresponding to the values of successive valid coins actuating the tertiary switch means and electrical contact means in association with the armature device engageable after predetermined additive movement of the slotted armature so that means electrically connecting the contact means in series with the switch means of the selecting rod and the electrical drive means for the merchandise provides a closed series circuit whereby the drive motor may only be energized after a purchasing sum has been received by the slotted armature as determined by the sum of its successive movements.

Other objects of the present invention will be evident from a consideration of the following specification taken in conjunction with the accompanying drawings.

In the drawings:

Fig. 3 is a plan view indicated by line 3—3 of Fig. 4 of a coin receiving and registering member, or slotted armature and illustrates solenoid actuating means therefor and a segmental electrical contact means mounted in cooperation therewith controlling the electrical drive mechanism for ejecting articles of merchandise from the present machine.

Fig. 4 is a side elevational view of the mechanism showing a coin resting in the slotted armature device of Figure 3 and further indicating the coin channels and a coin receiving box.

Fig. 9 is a perspective view of the merchandise platform of Figure 8.

Fig. 14 is a plan view taken along the line 14—14 of Fig. 4.

Fig. 16 is a fragmentary elevation of the sensitive switch means governing operation of the primary switch means of the machine.

Figure 5:
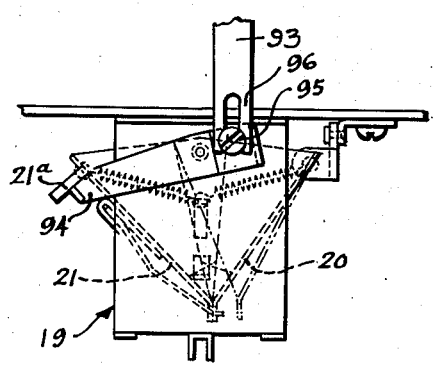
Fig. 5 and Fig. 5a are end views of the coin receiving box of Fig. 4, the first indicating the disposition of operable elements relevant to the discharge of coin into a cash box disposed below (not shown), the second indicating the disposal of operable elements when a coin is to be returned to the operator.

Referring to the drawings and assuming that the deposited coin is valid, the latter will fall into a slot 10 of the slotted armature 11 according to its value. Assuming that a twenty-five cent piece has been entered into the machine it will fall into the slot 12. The coin will rest on the actuating arm 13 of the sensitive switch 14 (see Figure 4), the latter governing current supply to the solenoid 15. The solenoid will, therefore, actuate the lever arm 16 which will always have the same degree of arcuate swing causing a tongue member 17 of the latter to slide along in the groove 18 of the slotted armature 11 until it engages the coin resting in the slot 12 upon the arm 13 thereby effecting radial travel of the armature 11 until the slot 12 passes the end of the switch arm 13 at which point the coin is allowed to drop and the sensitive switch cuts off the current energizing the solenoid 15 as the latter reaches the end of its actuating travel. Referring to Figure 5, the coin will fall into the coin receiving box 19 and is held therein by the hopper members 20 and 21.

Now, for purposes of clarity, it will be assumed that if the slotted armature contact element 22 (Figure 3) engages a contact 23 of contact means 23a that the motor circuit governing the discharge of merchandise from the machine will be closed. In the present instance, however, the contact 22 will have only progressed to the twenty-five cent mark or the contact 24 and since the latter contact may not be connected to the motor circuit, actuation of a merchandise selecting rod 25 adjacent a merchandise column 26 (see Fig. 1) where the article sells for say thirty-five cents will have no effect and, therefore, as a ten-cent piece is entered into the machine it would drop into the slot 27 of the slotted armature 11 resulting in further movement of the armature by the solenoid 15 as formerly described until the contact 22 completes the motor drive circuit by engaging the contact 23 corresponding to a thirty-five cent purchase.

It will be observed that the slots 10 of the armature 11 represent the summations of the basic coin value to be entered into the machine. Thus, the slot 10a is intended to accommodate a five-cent piece or basic unit and therefore, the slot 12 will serve to accommodate a twenty-five cent piece when the armature is in the normal position. The coin channels of the present machine accommodate five, ten, and twenty-five cent pieces and are disposed to deposit these denominations in a radially disposed circumferentially spaced apart relation corresponding to the slots 10a, 10b and 12 of the armature 11. A plurality of teeth 11a are disposed on the periphery of the armature 11 (Figure 3) and correspond in number to the slots 10 of the latter, being normally engaged by the pawl 55. The armature 11 is held after each incremental movement by the pawl 55 and, therefore, it is possible in the present construction to enter a series of coins of the basic value to make up the total sum required to effect a purchase, the solenoid 15 always actuating the tongue member 17 the same arcuate distance in the groove 18. Alternatively, any combination of coins of various denominations being multiples of the basic coin value may be entered into the machine to attain a purchasing sum.

It must be observed at this point that although the slotted armature has received the proper amount of coinage and is disposed to complete the motor circuit as formerly described, this circuit in fact must be completed by the operator himself and in order to trace this function reference must be made to Figures 6 to 9.

Referring to the latter figures, a merchandise selecting rod 25 relevant to a column 26 is shown mounting a rod 28 of non-conducting material at its inner end, the free end of the latter engaging electrical spring contact arms 29 and 30. The column 26 may be any size in accordance with the dimension of merchandise. The rod 28 carries an electrical conducting member 31 which is shown in its normal position in Figure 6 disposed away from the contact arms 29 and 30. The contact arms are connected so as to complete the motor drive circuit of the machine when the conducting member 31 is disposed therebetween by relevant actuation of the selecting rod 25 by an operator. It is obvious, of course, that if the total sum relevant to the column 26 is thirty-five cents that a twenty-five cent coin inserted into the machine as before mentioned could not allow the completion of the motor circuit by the operator since no series connection would exist between the contact arm 24 (see Figure 3) and the contact arms 29 and 30 in this instance.

Figure 8:
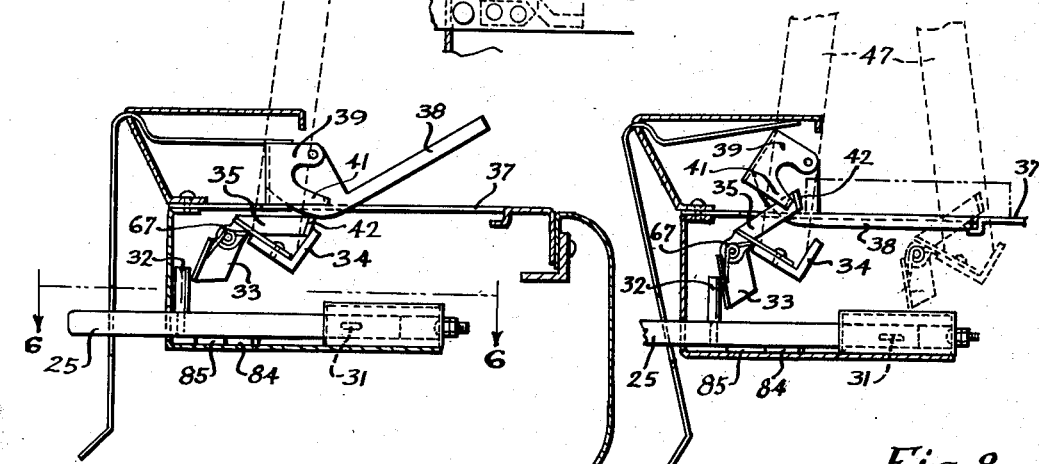
Fig. 8 is a developed operative view of Fig. 7 indicating the position of the various operative elements at different stages of operation in the ejection of an article of merchandise from the machine.
Figure 7:
Fig. 7 is a side section taken along the line 7—7 of Fig. 1 of a selecting rod and merchandise platform relevant to one column of the machine.

As the selecting rod 25 is actuated by the operator its lug 32 will engage the pivoted bracket 33 mounted on the carriage 34 (see Figures 7 and 8). The bracket arms 35 of the former will ride up through the gaps 36 of the merchandise support member 37 (Figure 9). Such may only be accomplished, however, if merchandise is sitting on the control arm 38 of the control member 39 which is swingably mounted on the bracket 40 of the merchandise support member 37. Such function will be due to the disposition of the guard arms 41 of the control member being disposed in the path of the bracket arms 35 (see Figure 7). If, however, merchandise is resting on the control arm 38, the guard arms 41 will not interfere with rotation of the bracket arms 35 through the gaps 36.

Since at this stage the motor circuit is completed the carriage 34 operable thereby (yet to be described) will be urged forward, the push fingers 42 of the bracket arms 35 riding on the upper surface of the merchandise support 37 adjacent the arm accommodating slots 43. The push fingers 42 are designed to engage the lowermost article of merchandise in the merchandise column and urge the same to a disposal chute (not shown) which carries the article to the operator.

Figure 12:
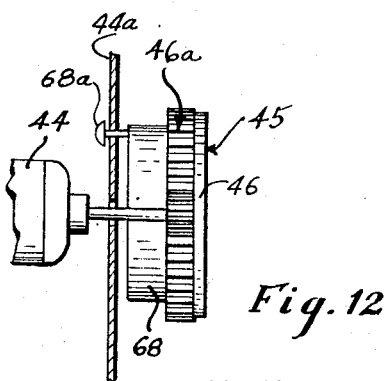
Fig. 12 is a side view of the drive and cam mounting of Figure 10.

Referring to Figure 12, the drive motor 44 is shown driving the spiral cam 45 by pinion 46 engaging gear 46a. A pair of hinged arms 47 hinged at their upper ends mount the carriage 34 at their lower ends, said carriage extending the full width of the machine below all columns. The arm 47 is controlled in its swinging movement through the links 48, 49, 49a and 50 and the roller 51 riding the spiral contour 52 of the cam 45, such that upon completion of the motor circuit the cam will be rotated to cause the arms 47 to swing the carriage 34 urging the bracket arms 35 forward along the merchandise support 37 to eject an article of merchandise. It may be noted that links 49, 49a are pivotally fixed on a common shaft 49b which serves as an anchorage for the linkage mechanism.

Figure 10:
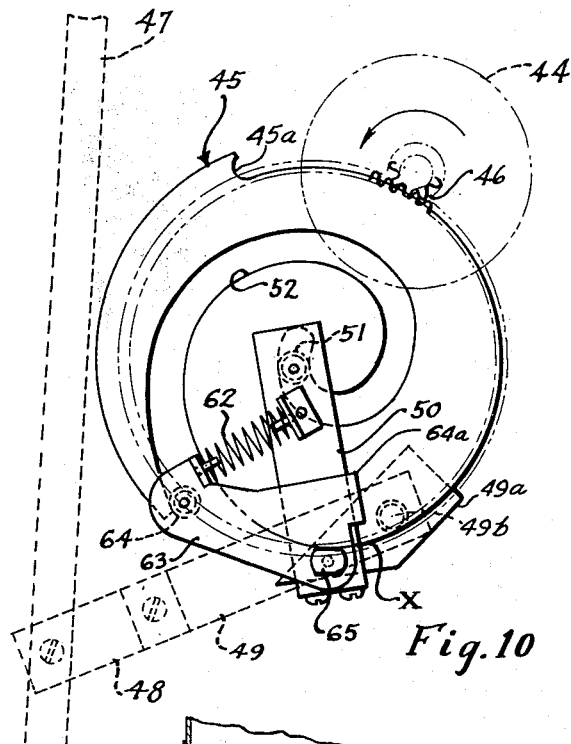
Fig. 10 is an elevation of a spiral cam operable by the electric drive of the present invention, its relevant mechanism being designed to control the ejection of merchandise from the machine.

The spiral cam merchandise discharging drive mechanism is illustrated in Figure 10 in the retracted position showing the position of the swingable arm 47 for the ejection of merchandise from the machine. The swingable arm 47 is actuated by the linkage 48, 49 wherein the arm 49 is rotated by the pivoted axle 49b to cause the arm to swing to the position illustrated in Figure 11. The axle 49b is actuated by the arm 49a fixed thereto, the latter arm fixedly mounting arm 50 carrying the roller 51, the latter riding within the spiral slot of cam 45 and in particular upon the spiralled cam surface 52 thereof. The cam is driven in clockwise manner in Figure 10 by the gearing 46 associated therewith and drive motor 44 whereby the roller 51 is caused to be moved to the outer position illustrated in Figure 11 to develop counter-clockwise movement of the arm 49a and the axle 49b. The mechanism is returned to the position illustrated in Figure 10 preferably by a clock spring device of well known form associated with the cam, the whole mechanism being cushioned at the retracted limit of its movement to absorb the inertia of movement by engagement of roller 64 with the outer surface of the cam slot as illustrated whereby the arm 63 carrying roller 64 is pivoted about the mounting of the guide roller 65 in clockwise direction and against the spring 62 extending from the arm 50. A flange part 64a of the arm 63 determines the outward position of the roller 64 with respect to the arm 50 when the roller 64 is free of the cam.

Figure 11:
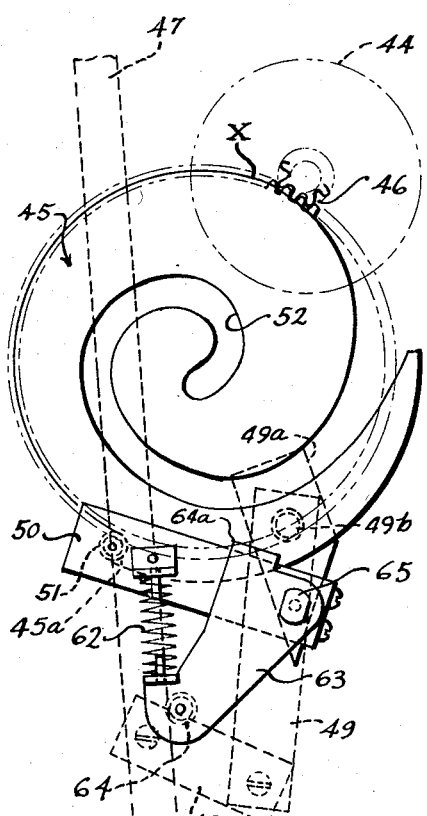
Figure 11 is a developed operational view of Figure 10 indicating the movement of the various elements driven through the spiral cam contour of the cam.

While the merchandise is travelling along the merchandise support 37, the roller 51 will approach the point X of true circular contour of the cam 45 at which point the merchandise discharge mechanism has reached its limit of discharging movement corresponding to the position of the linkage mechanism associated with the swingable arm 47 illustrated in Fig. 11, the remaining circular motion of the cam 45 to the position illustrated in Fig. 11 being permitted to absorb the inertia of the mechanism. At this stage (Figures 3, 4, 5, and 14) the control lever 53 is engaged by the swingable arm 47 and rotated clockwise. The finger 54 of the control lever will cause counter-clockwise rotation of the pawl 55, the latter being restrained by the spring 56, thereby releasing the slotted armature 11 and allowing the same to be returned to its normal position (Figure 3) by spring means 57. At the same time, however, the arm 58 of the control lever 53 rides along the undulating contour 59 of the swingable arm 60 (Figure 4). The arm 60 actuates the arm 61 of the hopper element 20 upwardly to allow the valid coin to drop into the cash box (see Figure 15) of the machine.

Now, when the slotted armature 11 returns to its normal position it will be obvious that current can no longer be fed to the motor 44. Since, however the roller 51 is retained on the circular portion of the cam 45, the inertia of the mechanism will carry the carriage 34 to the full limit of its travel to ensure ejection of an article of merchandise from the end of the support 37 by the bracket arms 35 during which period roller 51 slides unobstructed about the circular portion of the cam 45 from the point X to the shoulder 45a thereon at the point of end travel. Shock on the mechanism after the point of end travel has been reached is absorbed by the spring 62 relevant to the links 50 and 63 of the cam 45. It will be observed, however, that spring pressure throughout the travel over the spiral portion of the cam before mentioned is controlled by the cam engaging members 64 and 65 of the link 63.

When the bracket arms 35 (Figures 7 and 9) reach the end of their travel over the support 37 as determined by the carriage 34 of the swingable arms 47, the push fingers 42 will drop through the end gaps 66 due to the pivot spring 67 allowing a further article of merchandise to sit on the control arm 38. A large clock spring 68 anchored by pin 68a to frame 44a controls the return of the cam 45, and, therefore, the carriage 34 and the travel of the bracket arms 35 backwardly under the support 37 until the bracket member 33 engages the lug 32 of the selecting rod 25 pushing the latter outwardly and back to its normal position.

Jam proof mechanism

A device is incorporated in the present machine which prevents the reception of more than one coin at a time into the slots 10 of the slotted armature 11. Referring to Figures 4 and 14 it will be noted that a U-shaped lever 69 is shown mounted by its shaft 69a on the bracket mount 69b adjacent the outlets 70 of the coin channels 71, 72, and 73. Each outlet 70 is slotted transversely as at 74 substantially as indicated in Figure 4 to accommodate the lever 69, the latter preventing coins from dropping into the slots of the slotted armature when disposed in the slots 74. There are a number of ways in which this U-shaped lever 69 may be actuated to prevent coins from dropping into the slotted armature.

Primarily, the lever 69 is actuated by the cam lug 75 of the lever arm 16 (Figure 3), the cam face 76 engaging the roller 77 (Figure 4) when the arm 16 is actuated by the solenoid 15 to swing in a clockwise direction. The lever arm 69 will, therefore, swing up into the transverse slots 74 at this stage of operation, to prevent coins from dropping into the slotted armature while the latter is moving.

Secondly, the lever 69 is actuated by an arm 78 (Figure 14) which extends from the pawl 55 as at 79 to a position behind the lever 69 as at 80. Therefore, as the wire arm 78 is rotated counter-clockwise from the axis 81 of the pawl 55 the lever 69 is caused to swing up into the transverse slot 74 to block the exit of coins into the slotted armature 11.

Lastly, however, the U-shaped lever 69 may be actuated by the cam contour 82 of the lever arm 83 operative through the blocking bars 84 (Figure 6 and Figure 14) which are caused to move laterally of the machine in the direction on either side of any selecting rod 25 which is actuated. Each selecting rod 25 has a wedge lug 85 designed to separate the blocking bars 84 when actuated. Obviously, a series of bars 84 on one side of a selecting rod 25 will move transversely thereof as will those bars 84 on the other side of the rod 25. Each group of bars will move as a unit since all bars are normally butted at their ends as at 86, the group nearest the lever arm 83 actuating the same by their accumulative movement.

Thus, if the operator drops one coin into the machine followed closely by another, the first coin, upon engaging the switch arm 13, will cause the solenoid 15 to be energized, resulting in movement of the arm 16 sufficient to actuate the U-shaped lever 69 which pushes the closely following coin into a waiting position in an outlet 70 as it swings into the transverse slots 74. When the operator has deposited sufficient coinage to make a purchase and actuates a selecting rod 25 no further coins can fall into the slotted armature until the purchase is completed because the lever arm 83 is actuated counter-clockwise, its cam face 82 engaging the roller 77 of the arm 69 causing the latter to swing into the transverse slots 74. Similarly note the arm 78 is actuated by the pawl when clearing the machine.

*Coin selection*

Figure 1:
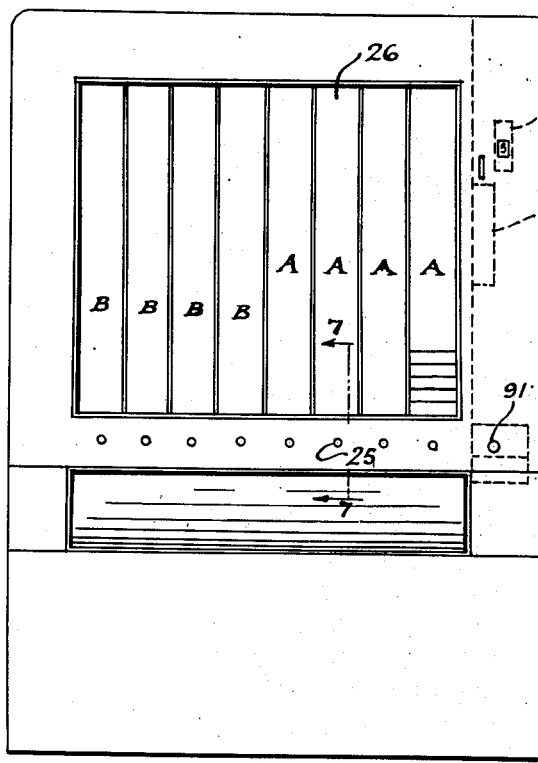
Fig. 1 is a front elevation of the present vending machine disclosing the merchandise storing columns and the cooperatively mounted selecting rods thereto.
Figure 2:
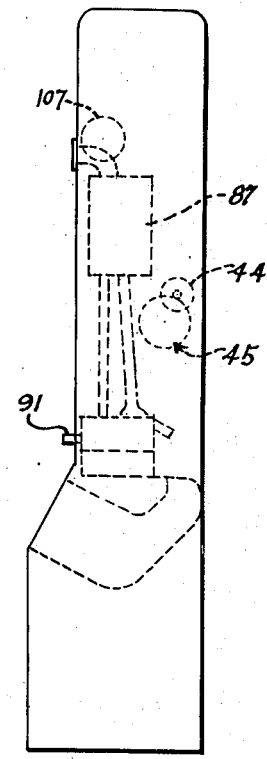
Fig. 2 is an end elevation of the present machine generally indicating the disposition of the various cooperating elements.
Figure 15:
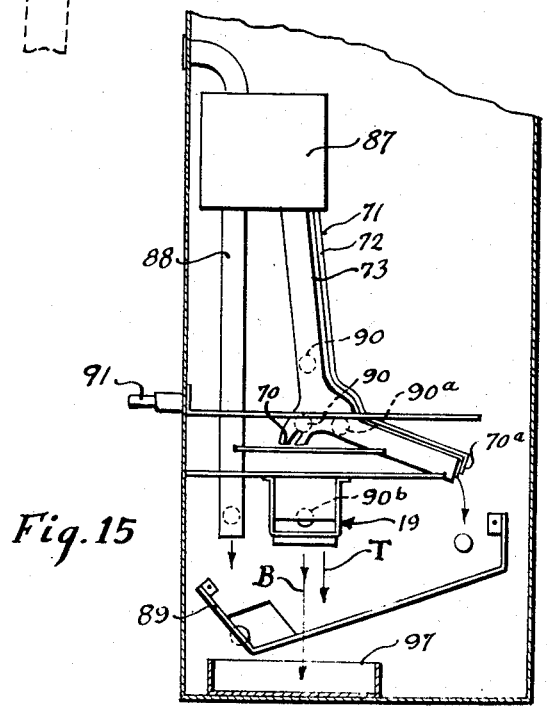
Fig. 15 is a cutaway view of the machine generally indicating the various coin channels relevant to the handling of valid and non-valid coins.

Referring to Figures 1, 2, and 15, a conventional slug rejecting mechanism 87 is mounted to receive all coins entered into the machine. Non-valid coins (Figure 15) pass directly by way of the chute 88 to the merchandise and return coin trough 89 which is accessible to the operator through the front of the machine. If the coin is valid it is passed through the slug rejector 87 and deposited into one of the coin channels 71, 72, and 73 according to its denomination. Normally the coin 90 will proceed through the appropriate outlet 70 of the channels and into the slotted armature 11 as formerly described. If the jam proof mechanism involving the lever arm 69 causes the latter to withhold a coin in an outlet 70 of a channel, a further coin 90a would bounce off the latter coin and proceed by the extended outlets 70a to the merchandise trough 89 where it may be retrieved by the operator.

Figure 5A:
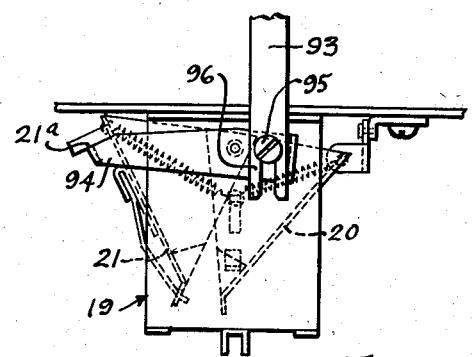
Figure 6:
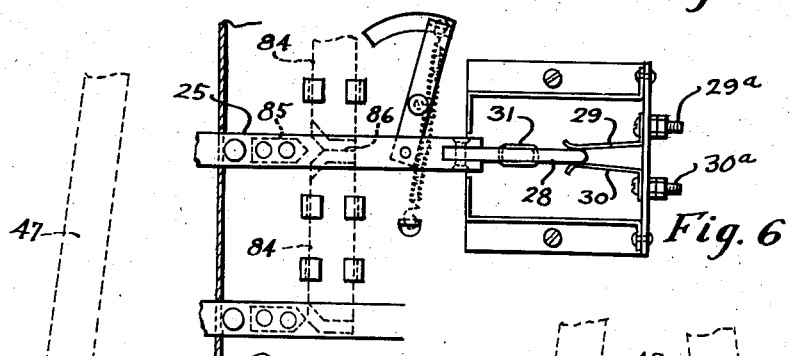
Fig. 6 is a plan view along the line 6—6 of Fig. 7 showing a selecting rod of the present machine.

Assuming that a valid coin is passed through the slotted armature and is withheld within the coin receiving box 19 (see Figs. 5 and 5a) the operator still may retrieve his deposit if the selecting rod 25 of the machine has not been actuated. The operator may cause return of the retained coins by actuating the clearing rod 91 in a positive direction causing counter-clockwise rotation of the lever arm 92 and a downward plunging of the link 93 (Figs 4 and 14) to actuate the swingable actuating arm 94 (Fig. 5a) and cause clockwise rotation of the latter by engaging the shoulder screw 95 by its bifurcated lower extreme portion 96. This actuation of the arm 94 which is operatively connected to the hopper member 21 as at 21a causes the latter to rotate clockwise (Figure 5a) allowing a coin 90b (Figure 15) to drop directly into the merchandise trough 89 as indicated by the arrow T. It is relevant to note however, that if the hopper member 20 is actuated by normal automatic operation of the machine as formerly described that the coin 90b will fall into the cash box 97 as indicated by the arrow B, the latter being enclosed within the walls of the machine and accessible to a collector as in conventional devices of this class.

*Electrical circuit*

Figure 13:
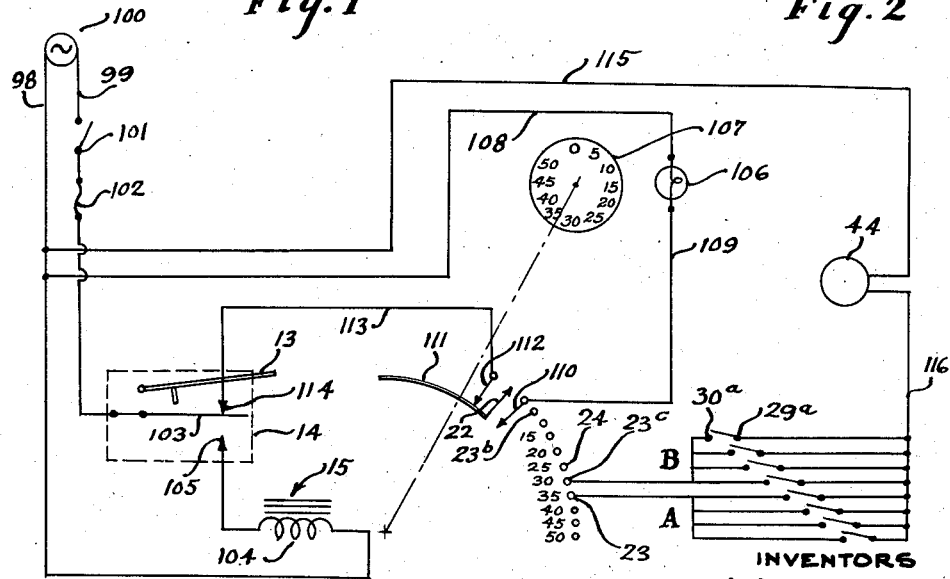
Fig. 13 is an electrical schematic of the circuit of the present invention relevant to the operation of the motor drive and credit indicating means.

Referring to Figure 13, the electrical circuit employed in the present machine is shown schematically. The lines 98 and 99 extend from a source of alternating current 100, the latter through a line switch 101 and a conventional fuse 102 to the armature 103 of the sensitive switch 14. The line 98 extends to the coil 104 of the solenoid 15, the other side of the solenoid being connected by the contact point 105 of the switch 14 to the armature 103 for parallel connection of the coil 104 across the source 100 when a coin is actuating the switch arm 13 as formerly described.

An indicating light 106 is incorporated in the present circuit and is used to light a credit indicating dial 107 as coinage is entered into the machine. The bulb 106 is connected by its line 108 to one side of the source 100 through the line 99. The bulb has its other terminal connected through the line 109 to a brush 110 (Figure 3) designed to engage the peripheral contact strip 111 of the slotted armature 11. At all times the peripheral contact strip 111 engages a brush 112 which is connected through the line 113 to the contact 114 of the sensitive switch 14. It will be observed that one a coin of basic value (say 5¢) has been entered into the machine the contact arm 22 of the armature will have progressed to engage the contact 23b at which point the brush 110 will engage the peripheral contact strip 111 of the armature 11 completing the circuit of the bulb 106. The electrical circuit of the lamp of bulb 106 is broken at contacts 103 and 114 when the armature and thus the indicator is moving under coin operation.

The motor circuit of the present device is disposed in the present circuit substantially in parallel with the formed parallelly connected solenoid and credit light circuits. The motor 44 is connected by its one terminal through the line 115 to the line 98 extending from the source of current 100. The other side of the motor is connected through the line 116 to the terminal 29a relevant to the switch mechanism of the selecting rods 25 of the machine. The other terminals 30a are connected to a contact of the contact means 23a (Figure 3) depending on the total sum required to effect a purchase for a relevant column.

The circuit is shown whereby the selecting rods and columns A are connected to the thirty-five cent contact 23, and the contacts 30a of the group B are connected to the thirty cent contact 23c. Assuming, therefore, that under group B the purchaser has entered the required sum (30¢ say) then actuation of the relevant selecting rod 25 will cause a through circuit through the terminal 30a and 29a of its switch by engagement of the contact element 31 (Figure 6) and since the armature will have progressed clockwise such that the lug 22 engages the contact 23c. In the manner formerly described a through circuit will be developed to feed the motor current by way of the connection 112 to the peripheral strip 111, the lead 113, the contact 114, and lead 103 ultimately to the source 100. It is not necessary to describe similar operation for group A and it will be realized, of course, that if it is desired each column may have its own purchasing price, the relevant switch means thereto having their contacts 30a connected to the relevant contact of contact means 23a according to the purchase sum required.

Credit indicator

In the present device a credit indicator is provided which comprises an indicating dial or rotatable disc 107 which is made of translucent material and carries the numerals thereon as indicated in Figure 13 which correspond to summations of basic coin value entered in the machine. The disc 107 is operatively related by conventional cable means to the slotted armature 11 and, therefore, as the armature moves progressively according to the coin value entered, the disc 107 will take up corresponding radial positions with respect to the window (not shown). The indicating light 106 is mounted behind the disc 107 to cause the latter to be lighted to indicate the summations of coins entered into the machine. It is obvious that since movement of the armature 11 is dependent on valid coins being entered into the machine that only those checks accepted by the machine will be entered to the total credit indicated at any one time.

Clearing mechanism

Referring to Figures 4, 14, and 16, it will be observed that the machine may be "cleared" by actuation of the clearing rod 91. A number of substantially simultaneous operations result and include counter-clockwise rotation of the lever arm 92 operatively related to the clearing rod bar 115, and downward plunging of the link 93 to actuate the swingable actuating arm 94 to cause the hopper member 21 to rotate clockwise in the manner described to allow a coin 90b (Fig. 15) to drop directly into the merchandise trough 89. The sloping face 116 of the clearing rod bar 115 at the same time will engage the roller 117 mounted on the free end of the crank arm 118, the latter being mounted in brackets 119 and 120, an operating arm 121 extending therefrom downwardly to mount the spring 122 as at 123. The other end of spring 122 connects as at 124 to the sensitive switch means 14, the latter being pivotally mounted as at 125 on the bracket 126, and an opposing spring 127 extends from the point of connection 124 of the spring 122 of the switch 14 to the bracket to connect as at 128. The switch 14 is shown having its arm 13 supporting the coin 90 but it will be noted that upon counter-clockwise rotation of the crank arm 118 that the arm 121 will move counter-clockwise causing the switch 14 to take up the position indicated by chain lines and allowing a coin 90 to drop into the receiving box 19.

A further function is evident in that the arm 129 extends downwardly from the clearing bar 115 to engage the extended arm portion 55a of the pawl 55 causing counterclockwise rotation of the same, thereby simultaneously releasing the slotted armature to return to its normal position if advanced and causing lever 69 to swing up into the slots 74 of channels 73 through operative relation of the arm 78 formerly described. Return of the clearing bar 115 is ensured by the return spring 130 connected to the bar 115 as at 131 and to the bracket 132 mounting the lever 92 as at 133.

If a non-valid coin has been entered into the machine and it is desired to "clear" it, the rod 134 extending upwardly from the lever arm 92 and connected to the latter as at 133a causes release of a slug from a conventional slug rejector, in a conventional manner, allowing the same to pass down the slug channel 88 (Fig. 15) to the merchandise trough 89. Finally, it will be noted that the clearing rod 91 engages the blocking bar 84 by its face 91a, thus causing all blocking bars 84 to be engaged tightly together at their ends and preventing a selecting rod from being actuated.

Alternatives

It will be observed that only the preferred forms of all elements and structure relating to the present invention have been shown. Therefore, it is not intended that the electrical devices employed are limited to the solenoid or motor drive described since it is obvious that any type of drive device could be used without departing from the spirit of the invention. Further, it is not necessary that the slotted armature 11 be formed in the segmental manner shown, for the main function to be accomplished by that device is the relative travel between the brush means 112, 111, 22, and 110 of the contacts 23a and this could also be accomplished by an axially moving slidable platform moving relative to a plurality of contacts corresponding to the contact means 23a in Figure 3 in which case such slidable platform would have a plurality of parallelly disposed slot means designed to receive a coin in conformity with the design of the slotted armature. Again, it is not necessary that the slotted armature be actuated by a separate drive such as a solenoid but may be actuated by the drive motor shown through a conventional drive mechanism.

The present vending machine is not limited either in the size of merchandise handled, the price of merchandise, or the number of merchandise columns. One of the main features of the present machine is involved in the provision of slotted armature means wherein each slot corresponds to a multiple of the basic coin value to be entered into the machine, wherein the first slot may be five cents, say, and the second would then be ten cents, and the third, fifteen cents, et cetera. The travel of the slotted armature is determined by the distance between a coin resting in a slot of the same and the first slot thereof, since the tongue member 17, whether moving on an arcuate or straight path (depending upon design) would have the same length of travel no matter what the coin value and depending only upon the stroke of the armature of the solenoid 15. It is obvious, of course, that the swingable arms 47, carrying the carriage 34 in a pendulum-like manner, may be mounted from a pivot point below the carriage and the driving mechanism and other operative means disposed in the lower portion of the machine to allow more space for storage of merchandise in the upper portion of the machine and the merchandise columns. The two basic operations involved are essentially the closing of a part of the electrical discharge actuating circuit by entry of a proper summation of currency into the machine and the completing of that circuit by the actuation of a selecting rod of the column corresponding to the purchase price entered, thereby causing discharge of an article of merchandise from the machine. The operator is informed of his credit at any time by the credit indicating means provided and may retrieve the money entered so long as a purchase has not been effected. The vending price of any column may be changed by simple adjustment in the connecting of the appropriate lead 30a to the appropriate contact of contact means 23a. Since the coin return mechanism is independent of the electrical circuit for discharge of merchandise, if this latter circuit breaks then the operator may still get his money back. The fact that the merchandise is not discharged by the operator himself results in the provision of a very small selecting rod which cannot be firmly gripped by an operator and, therefore, is not likely to be damaged.

Since only the preferred embodiment of the present invention has, therefore, been described to set forth the many defining features of our invention over the prior art, it is submitted that the present disclosure should not be limited in any way except as indicated by the scope of the following claims.

What we claim as our invention is:

1. A coin totalizer device of the class adapted to accept coins of various denominations, and comprising in combination: an armature body, means for supporting said body in a retracted position for horizontal movement therefrom on a predetermined path, a plurality of equally spaced apart slots in said body disposed along but transversely of the path of movement thereof and being of a size allowing passage therethrough of the largest denomination of coinage acceptable by the totalizer device, a free-ended coin support arm disposed beneath said slots but traversable by the latter upon movement of the armature body along said path, an actuating member of constant stroke movable in the direction of movement of the armature body to engage a coin supported by said arm in a slot of said body to cause the armature body to be moved along said path a distance corresponding to the distance of the slot in which the coin is supported from the free end of said support arm, electrical drive means for moving said actuating member, a source of electrical energy for energizing said drive means, an electrical switch actuable by said coin support arm, and means connecting said switch electrically in series with said electrical drive means and said source to provide energization of said drive means upon actuation of said switch.

2. A coin totalizer device of the class adapted to accept coins of various denominations, and comprising in combination: an armature body, means for supporting said body in a retracted position for horizontal movement therefrom on a predetermined path, a plurality of equally spaced apart slots in said body disposed along but transversely of the path of movement thereof and being of a size allowing passage therethrough of the largest denomination of coinage acceptable by the totalizer device, a free-ended coin support arm disposed beneath said slots but traversable by the latter upon movement of the armature body along said path, an actuating member of constant stroke movable in the direction of movement of the armature body to engage a coin supported by said arm in a slot of said body to cause the armature body to be moved along said path a distance corresponding to the distance of the slot in which the coin is supported from the free end of said support arm, electrical drive means for moving said actuating member, a source of electrical energy for energizing said drive means, an electrical switch actuable by said coin support arm, means connecting said switch electrically in series with said electrical drive means and said source to provide energization of said drive means upon actuation of said switch, and means for conducting a coin of a predetermined denomination to a slot of said armature body positioned over said support arm, but spaced from the free end of the latter a distance determined by a number of intermediate slots of said body therebetween wherein said number of slots corresponds to the number of lowest denomination coins acceptable by the totalizer of a total value equal to the value of said coin of predetermined denomination.

3. A coin totalizer device of the class adapted to accept coins of various denominations, and comprising in combination: an armature body, means for supporting said body in a retracted position for horizontal movement therefrom on a predetermined path, a plurality of equally spaced apart slots in said body disposed along but transversely of the path of movement thereof and being of a size allowing passage therethrough of the largest denomination of coinage acceptable by the totalizer device, a free-ended coin support arm disposed beneath said slots but traversable by the latter upon movement of the armature body along said path, an actuating member of constant stroke movable in the direction of movement of the armature body to engage a coin supported by said arm in a slot of said body to cause the armature body to be moved along said path a distance corresponding to the distance of the slot in which the coin is supported from the free end of said support arm, electrical drive means for moving said actuating member, a source of electrical energy for energizing said drive means, an electrical switch actuable by said coin support arm, means connecting said switch electrically in series with said electrical drive means and said source to provide energization of said drive means upon actuation of said switch, means for conducting a coin of a predetermined denomination to a slot of said armature body positioned over said support arm, but spaced from the free end of the latter a distance determined by a number of intermediate slots of said body therebetween wherein said number of slots corresponds to the number of lowest denomination coins acceptable by the totalizer of a total value equal to the value of said coin of predetermined denomination, and means for maintaining said armature in a position attained after movement by said actuating member in accordance with the value of the coin.

4. A coin totalizer device of the class adapted to accept coins of various denominations, and comprising in combination: an armature body, means for supporting said body in a retracted position for horizontal movement therefrom on a predetermined path, a plurality of equally spaced apart slots in said body disposed along but transversely of the path of movement thereof and being of a size allowing passage therethrough of the largest denomination of coinage acceptable by the totalizer device, a free-ended coin support arm disposed beneath said slots but traversable by the latter upon movement of the armature body along said path, an actuating member of constant stroke movable in the direction of movement of the armature body to engage a coin supported by said arm in a slot of said body to cause the armature body to be moved along said path a distance corresponding to the distance of the slot in which the coin is supported from the free end of said support arm, electrical drive means for moving said actuating member, a source of electrical energy for energizing said drive means, an electrical switch actuable by said coin support arm, means connecting said switch electrically in series with said electrical drive means and said source to provide energization of said drive means upon actuation of said switch, means for conducting a coin of a predetermined denomination to a slot of said armature body positioned over said support arm, but spaced from the free end of the latter a distance determined by a number of intermediate slots of said body therebetween wherein said number of slots corresponds to the number of lowest denomination coins acceptable by the totalizer of a total value equal to the value of said coin of predetermined denomination, means for maintaining said armature in a position attained after movement by said actuating member in accordance with the value of the coin, an electrical contact member carried by said armature body, a plurality of separate electrical contact members disposed to be consecutively traversed by the contact on said armature body upon movement of the latter along said predetermined path, said consecutively traversed contacts individually representing different sums of coinage totalized by said armature through consecutive movements of the latter.

JAROSLAV MUNZ.
JAROSLAV TICHOPAD.

References Cited in the file of this patent

UNITED STATES PATENTS

| Number | Name | Date |
|---|---|---|
| 1,336,628 | Hughes | Apr. 13, 1920 |
| 1,635,451 | Zsoldos | July 12, 1927 |
| 2,073,870 | Johns | Mar. 16, 1937 |
| 2,236,198 | Osborne | Mar. 25, 1941 |
| 2,279,936 | Brodie et al. | Apr. 14, 1942 |
| 2,330,186 | Jetseck et al. | Sept. 21, 1943 |
| 2,333,176 | Hoban | Nov. 2, 1943 |
| 2,366,469 | Andres | Jan. 2, 1945 |
| 2,377,413 | Fry | June 5, 1945 |
| 2,413,304 | Fry | Dec. 31, 1946 |

FOREIGN PATENTS

| Number | Country | Date |
|---|---|---|
| 137,543 | Great Britain | Apr. 11, 1921 |
| 335,914 | Great Britain | Sept. 29, 1930 |
| 375,264 | Great Britain | Dec. 24, 1930 |
| 354,418 | Great Britain | Aug. 13, 1931 |
| 403,366 | Great Britain | Dec. 11, 1933 |
| 578,158 | Great Britain | June 18, 1946 |
| 580,500 | Great Britain | Sept. 10, 1946 |